April 26, 1927.

E. R. BURTNETT 1,626,387

INTERNAL COMBUSTION ENGINE

Filed Jan. 4, 1923    2 Sheets-Sheet 1

Fig.1

INVENTOR.
EVERETT R. BURTNETT.
BY
Martin P. Smith,
ATTORNEY.

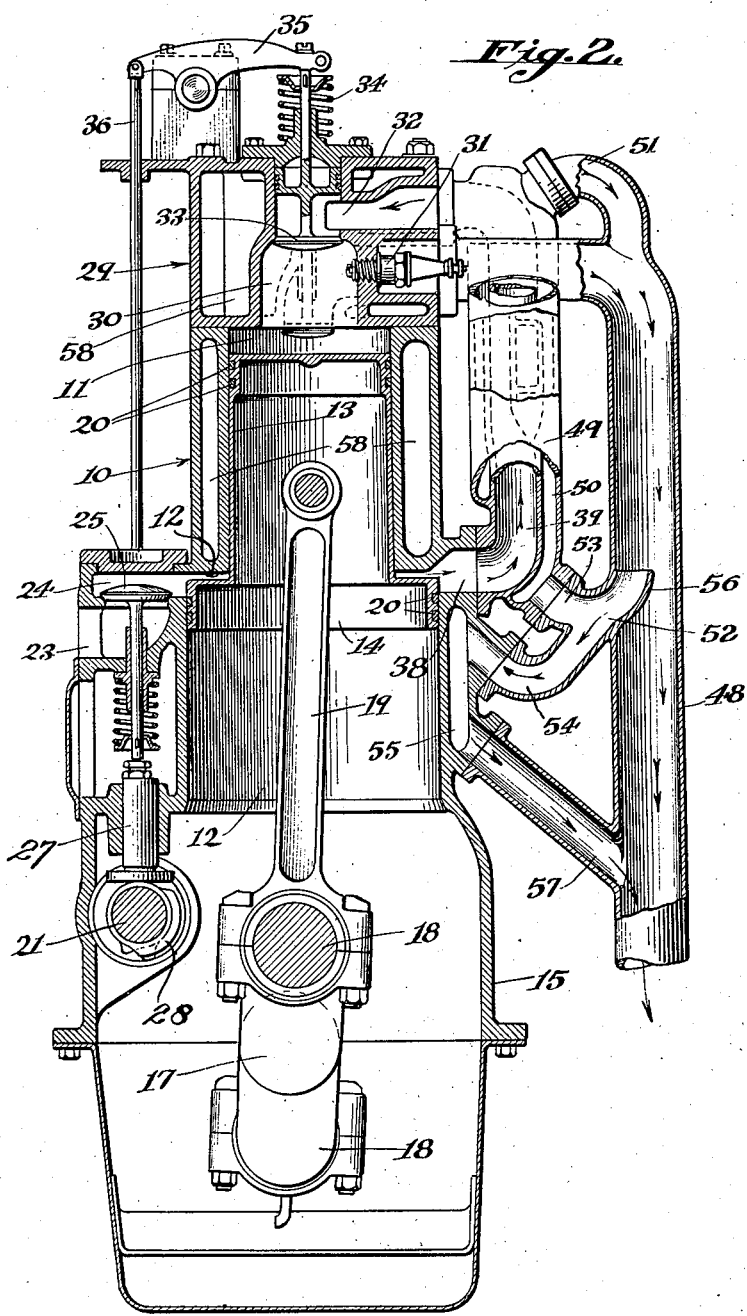

Patented Apr. 26, 1927.

1,626,387

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed January 4, 1923. Serial No. 610,699.

My invention relates to an internal combustion engine of the two stroke cycle principle, the principal objects of my invention being to generally improve upon and simplify the construction of the existing types of two cycle internal combustion engines; to combine with a structure wherein two pistons, each having two different diameters, and which are arranged for operation respectively in two chambers, each having two different diameters, simple and efficient valve means for bringing about the admission of gaseous fuel to the precompression chambers for the full duration of the induction or suction stroke of the piston; to provide valvular means for controlling the transfer of the precompressed gaseous fuel charges from the precompression chambers into the combustion chambers; to provide for the release of expansive pressure and the exhaust of the products of combustion following combustion and expansion of the gaseous fuel charges within the combustion chambers; to provide for the stratification of the inducted gaseous fuel charge and the residual products of combustion that remain in the clearance and expansion chambers at the termination of the working or power stroke of the pistons.

A further object of my invention is to provide an exhaust valve in the cylinder head and which provision is necessary, due to the two diameter piston arrangement, for, if the exhaust port were located so as to be uncovered by the head of the piston as the latter passes crank end dead center and which is conventional practice, the gaseous fuel under pressure in the annular space, directly beneath the piston portion of least diameter and directly below the so formed exhaust port, would leak through the piston clearance from said annular space to said exhaust port, inasmuch as the packing rings on the piston head would, at certain times be positioned above said port, due to the movement of the piston inwardly on its compression stroke.

Further objects of my invention are to provide an engine of the character referred to that is of relatively simple structure, of low production cost, exceptionally short in overall length, to provide simple and efficient means including a cam shaft for effecting the positive opening of the valves at the desired time intervals, to provide for the proper driving of said cam shaft at a speed in harmony with the functioning order of the two stroke cycle of operation, to provide a heating cell around the larger diameter section of the cylinder, through which cell is adapted to circulate hot exhaust gases, for the purpose of preheating the gaseous fuel while it is being precompressed and while being transferred to the combustion chamber.

With the foregoing and other objects in view, my invention consists in certain novel features of construction and arrangement of parts that will be hereinafter more fully described and claimed and illustrated in the accompanying drawings, in which:—

Fig. 1 is a vertical section taken lengthwise through the center of an engine of my improved construction.

Fig. 2 is a cross section taken on the line 2—2 of Fig. 1.

Referring by numerals to the accompanying drawings which illustrate a practical embodiment of my invention, 10 designates a cylinder block in which is formed a pair of chambers having parallel axes.

The upper portion 11 of each chamber and which is of the least diameter, constitutes a combustion and expansion chamber, and the lower portion 12 of said chamber and which is of the greatest diameter, constitutes a precompression chamber for gaseous fuel.

Arranged for reciprocatory movement within the chambers 11 is a piston 13 having its lower portion formed into a piston member 14, of greater diameter than said piston 13, and said piston member 14 being arranged for operation within chamber 12.

Cylinder block 10 is mounted upon a suitable crank case 15 having bearings 16 in its end walls for a crank shaft 17 and the cranks 18 thereof being arranged 180 degrees apart.

Pistons 13 are suitably connected to the respective cranks 18, preferably by the usual connecting rods 19.

Suitable packing rings 20 are seated in the periphery of piston member 14 and in the upper portion of the periphery of piston 13.

Arranged for rotation in suitable bearings in the end walls of the crank case is a cam shaft 21, that is connected by suitable gearing 22, to the crank shaft 17, so as to rotate at the same speed therewith.

Formed in block 10 is a gaseous fuel inlet duct 23, having branches 24 that lead respectively to the upper portions of the precompression chambers 12.

Formed in each branch duct 24 is a seat for a gaseous fuel inlet valve 25 of the poppet type, and each valve having a spring 26 associated with its stem, and which spring normally retains the valve upon its seat.

The lower ends of the stems of these valves rest upon plungers 27 and the lower ends of the latter bear directly upon cams 28 on cam shaft 21. The lobes of these cams are approximately 180 degrees in length and they are disposed so as to give the inlet valves a slight lag in opening and closing.

Secured on top of the cylinder block 10 is a head block 29, in the underside of which are formed pockets or recesses 30 that communicate respectively with the combustion chambers 11 and said recesses performing the functions of ignition chambers.

Seated in the side wall of block 29, adjacent to each chamber 30 is a spark plug 31, the inner ends of the terminals of the electrodes thereof, projecting into the corresponding ignition chamber.

Leading through block 29 to the upper portion of each ignition chamber is a precompressed gaseous fuel inlet duct 32, and formed at the point where this duct communicates with chamber 30 is a seat for an inwardly opening poppet valve 33.

A spring 34 is associated with the stem of each valve 33 for normally retaining the same upon its seat and bearing on the upper end of each stem, is a rocker arm 35.

These rocker arms are fulcrumed on suitable brackets on top of block 29 and they are adapted to be rocked by push rods 36, the lower ends of which bear on cams 37 on shaft 21. The lobes of these cams 37 are approximately 60 degrees in circumferential length.

Formed through the wall of block 10 and preferably at a point diametrically opposite to the fuel discharge duct 24, is a compressed gaseous fuel inlet opening 38 and leading from each of these openings, upwardly and at an angle, is a gaseous fuel conduit 39, the upper end thereof being connected directly to the inlet duct 32 of the other or opposite cylinder. As a result of this arrangement, the conduits 39, which are entirely separate, cross each other at an intermediate point between the openings 38 and ducts 32, so that while the engine is in operation, each piston 14 functions as a compression for gaseous fuel that passes or is transferred through conduit 39 to the combustion chamber in the other cylinder.

Formed in the underside of head block 29 above each combustion chamber 11 is an exhaust port 40, that is normally closed by a valve 41. Each valve is normally held on its seat by a spring 42 that is associated with the valve stem, and bearing on the upper end of each stem is an end of a suitably fulcrumed rocker arm 43.

These rocker arms are engaged by push rods 44, that are in turn, engaged by plungers 45 and the latter engaging cams 46 on cam shaft 21. The lobes of these cams are approximately 70 degrees in length.

Leading from each port 40 to the exterior of block 29, is an exhaust duct 47, and leading outwardly and downwardly from the outer end of each duct is an exhaust pipe 48.

A jacket 49 surrounds the conduits, thereby forming between said conduits and jacket, a circulation chamber 50 and leading from the upper portion of this chamber to the upper portions of the exhaust pipes 48, are short conduits 51.

Leading from the intermediate portion of each exhaust pipe 48, is a short conduit 52 having branches 53 and 54 that lead respectively to the lower portion of the chamber 50 and to a circulation cell or chamber 55 that is formed in the cylinder wall around the precompression chamber 12.

A curved lip or deflector 56 is formed in conduit 48, immediately below the inlet end of conduit 52 and thus a portion of the exhaust gases passing through pipe 48 will be deflected into conduit 52 and its branches 53 and 54.

Leading from the lower portion of each chamber 55, downwardly to the adjacent exhaust pipe 48 is a conduit 57.

Head 29 and the walls of block 10 surrounding the combustion chambers 11, are provided with communicating chambers 58 through which may be circulated a suitable fluid medium, such as water.

The operation of my improved engine is as follows:

As each piston moves downward and approaches its low center, the corresponding cam 28 and plunger 27 opens the corresponding inlet valve 25, thereby admitting to the chamber 12, a charge of gaseous fuel, and on the succeeding upward stroke of the piston, this charge is compressed within said chamber 12, and within the duct 39 that leads therefrom to the upper end of the other or twin cylinder.

The pistons travel in opposite directions, so that when one piston is at its top center, the other piston is at low center.

At the end of the compression stroke of one piston, the other piston is at the end of its power stroke, at which time the corresponding exhaust valve 41 is open to permit the escape of the burnt products of combustion and the internal pressure to drop to practically atmospheric pressure.

At this time, the corresponding transfer valve 33 is opened for a short period by the action of corresponding cam 37, push rod 36 and rocker arm 35, thus admitting to the corresponding ignition chamber 30 and combustion chamber 11, the charge of gaseous fuel that was precompressed in the chamber 12 of the opposite cylinder.

This precompressed fuel charge is admitted directly on top of the residual products of combustion within the combustion chamber, and on the succeeding upward stroke of the corresponding piston, the residual volume and the gaseous fuel charge will be compressed in stratified relation within the upper portion of the combustion chamber with a stratum of gaseous fuel practically filling the ignition chamber and a stratum of residual products of combustion directly above the head of the piston.

As the piston passes high center, a spark is produced between the terminals of spark plug 31, thereby igniting the compressed stratum of gaseous fuel within ignition chamber 30, and the expansion resulting from combustion, drives the piston downward on its power stroke.

During this power stroke, a fresh charge of gaseous fuel will be drawn into the corresponding chamber 12, as piston member 14 moves downward and which charge is immediately thereafter precompressed and transferred through duct 39 to the upper end of the other, or twin cylinder.

The precompressed gaseous fuel is effectually preheated by the circulation of the preheated exhaust products of combustion that circulate through the various cells or chambers 50 and 55.

Thus it will be seen that I have produced an engine operating on the two stroke cycle principle that is relatively simple in structure, of low production cost, very short in overall length, and requiring relatively little fuel compared to its power output.

Minor changes in the size, form and construction of the various parts of my improved engine, may be made and substituted for those herein shown and described without departing from the spirit of the invention, the scope of which is set forth in the appended claims.

I claim as my invention:

1. In an internal combustion engine, a combustion cylinder, a detachable head therefor, said head being provided in its under side with an exhaust products of combustion outlet pocket and a charge volume inlet pocket, the depth of the latter being greater than that of the exhaust outlet pocket, both of which pockets communicate directly with the head end of the chamber in the combustion cylinder, the exhaust products pocket being provided at its lower end with a valve seat, a poppet valve normally resting on said seat, the inner end of the charge volume inlet pocket being provided with a valve seat and a poppet valve seat, and a poppet normally resting on said last mentioned valve seat.

2. An internal combustion engine having two cylinders, each provided with a chamber having two diameters, the smaller diameter chamber constituting a combustion chamber and the larger diameter chamber constituting a gaseous fuel precompression chamber, a poppet valve for controlling the admission of gaseous fuel into each precompression chamber, a two diameter piston arranged for operation within each cylinder, a removable head for said cylinders, said head having two valve seats formed directly above each combustion chamber, one seat being located within a pocket that extends inwardly from the face of the head, ignition means seated in the head and extending into said pocket, a duct extending from the pocket above the valve seat therein to the upper portion of the precompression chamber in the other one of the two cylinders forming the engine unit, a poppet valve normally resting on the last mentioned valve seat, the other one of the two poppet valve seats being formed on the face of the head, a valve normally resting on the latter seat, an exhaust duct leading through said head from a point above said last mentioned valve leading to the precompression chambers, a crank shaft to which the pistons of the engine are connected, a cam shaft driven from said crank shaft, and valve unseating means arranged to be actuated by the cams on said cam shaft.

3. In an internal combustion engine, two cylinders arranged with their axes parallel, each cylinder having a combustion chamber and a precompression chamber, two diameter pistons arranged for operation within said cylinders, a removable cylinder head having two pocket valve heads disposed directly over each cylinder chamber, one of said head valve seats being located at the head of a pocket that extends inwardly from the under face of the head and having an axis at an angle of 90° relative to the face of the head, a spark plug located in the wall of said pocket, a duct connecting said pocket with the upper portion of the pre-compression chamber within the other cylinder, the other one of the two valves within each cylinder head having a seat in the under face of said head, the axis of each valve being at an angle of 90° relative to the under face of the cylinder head, a duct leading from the second mentioned valve for the release of spent gases, a valve located to the side of each annular pre-compression chamber for the admission of gaseous fuel to said chamber, a cam shaft located in the crank case to the side of the crank shaft and having an axis parallel therewith, valve actuating means between the cam of the cam shaft and all of said valve, and means for driving the cam shaft at the same speed with the crank shaft.

In testimony whereof I have signed my name to this specification.

EVERETT R. BURTNETT.